May 12, 1959  W. M. TENER  2,886,255
COIL WINDING MACHINE
Filed Dec. 12, 1952  4 Sheets-Sheet 2
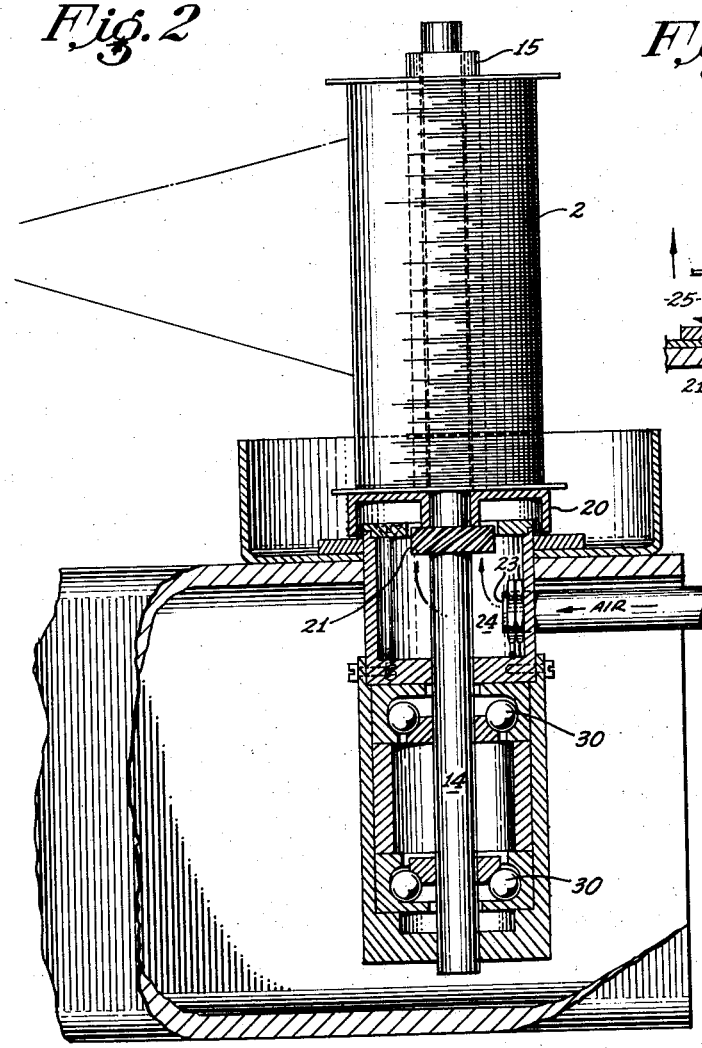
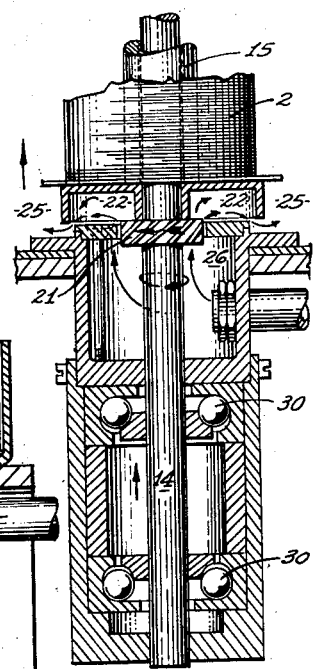
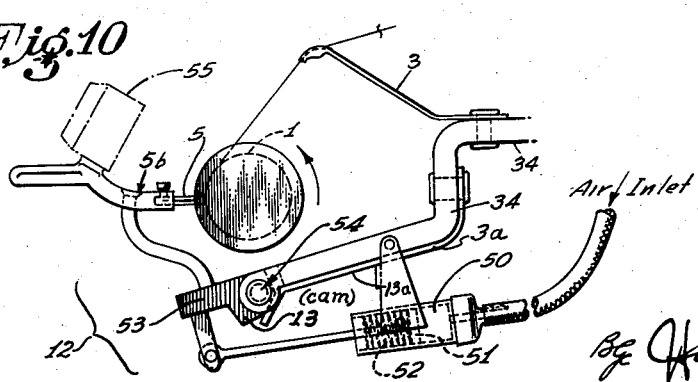
INVENTOR:
Wallis M. Tener
By Herbert E. Metcalf
His Patent Attorney

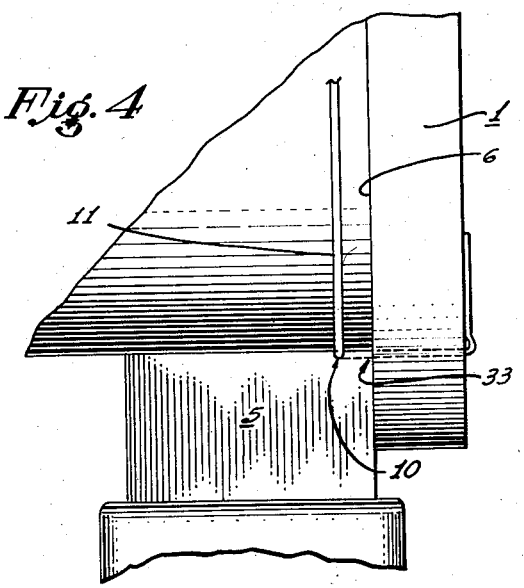
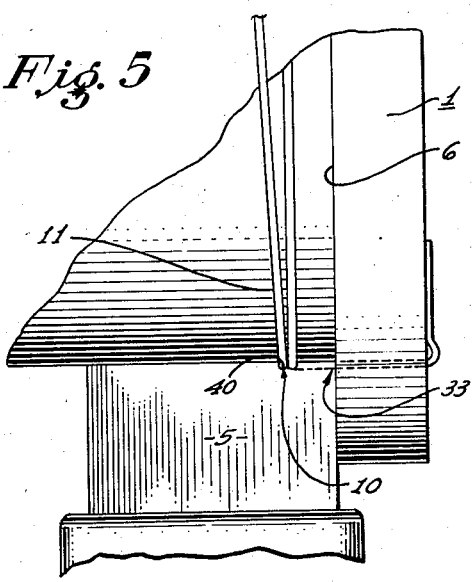
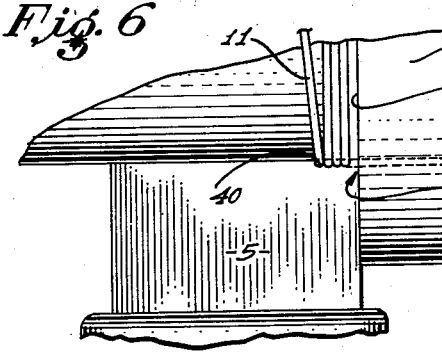
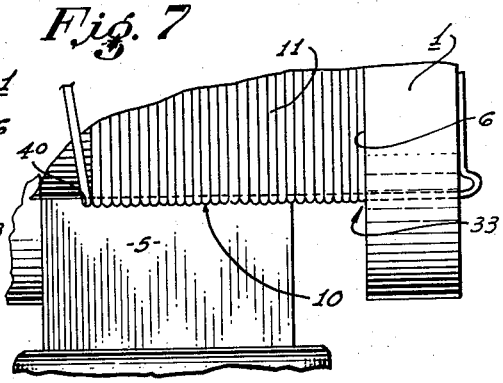
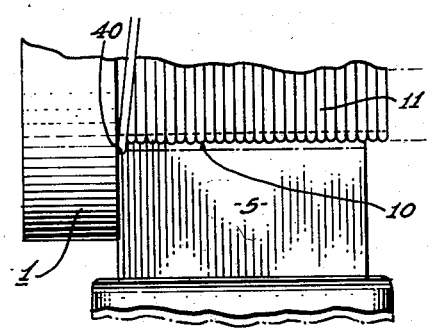
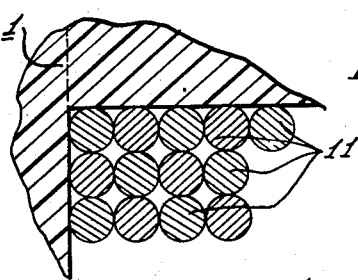

INVENTOR:
Wallis M. Tener
By Hubert E. Metcalf
His Patent Attorney

United States Patent Office 2,886,255
Patented May 12, 1959

2,886,255
COIL WINDING MACHINE

Wallis M. Tener, Torrance, Calif., assignor to Northrop Aircraft, Inc., Hawthorne, Calif., a corporation of California Application December 12, 1952, Serial No. 325,558

2 Claims. (Cl. 242—9)

My invention relates to coil winding mechanisms and more particularly to those used in the winding of wire having a diameter in the order of one mil or less.

In layer winding coils of very small diameter wire two major problems are incurred, viz, the failure to compactly wind the wire on the coil and the breakage of the wire during the winding process.

It is, therefore, the general object of my invention to remedy the defects inherent in present day winding techniques, especially those related to coils of small diameter wire.

The need for a compactly wound coil is felt wherever it is necessary to have a strong magnetic field induced around the coil and, by the nature of the design, the factor most amenable to change is the number of turns of wire on the coil. In coils of small diameter wire, hand winding is usually indulged in, a rather long and tedious process fraught with possibilities of voids in the windings or overlapping of the turns, which has failed to produce the maximum number turns.

A further object of my invention is to eliminate the problem of wire breakage during the winding process—one which has long plagued the industry winding coils of small wire diameter. This is accomplished by placing a counter torque on the supply spool, which results in keeping the wire relatively taut while being wound upon the winding spool, and by countering the effect of the inertia force of the supply spool.

An incidental effect arising from the means employed to preclude breakage is the resultant freedom from knotting and entangling of the wire being fed from the supply to the winding spool.

Another object of my invention is to dispense with the need to rely primarily on the use of guides for positioning the wire and also with the use of closely matched gearing arrangements for cross feeding the wire onto the coil. These are relegated to a secondary role by utilizing a "Teflon" blade which shall be more fully described hereinafter.

Other uses and objects will also become apparent from the subsequent disclosure.

For a complete disclosure of my invention, a detailed description of a preferred embodiment will now be given in connection with the accompanying drawings forming a part of the specification wherein:

Figure 2 is a cross-sectional view showing the pneumatic mechanism for applying a counter torque to the supply coil.

Figure 3 is a cross-sectional view showing the aforementioned mechanism and the operation of the bearings and the other movable parts under the actuation of the air pressure.

Figure 4 shows the coil form and the initial turn of wire secured to the side of the coil form.

Figure 5 shows the next turn of wire going on the coil form and laterally disposing the initial one toward the side of the coil form.

Figure 6 shows the void left by the initial turn of wire almost closed by the lateral disposition of the turns.

Figure 7 shows the turns going in the other lateral direction after filling up the initial void.

Figure 8 shows the turns of wire overlapping at the end of the first row and beginning to form a new row with the direction reversed consequent on reversal of rotation of a shaft traversing a wire laying means.

Figure 9 shows several layers of windings.

Figure 10 is a detail drawing of the force producing means for applying pressure through the wiper to the coil form.

Figure 1:
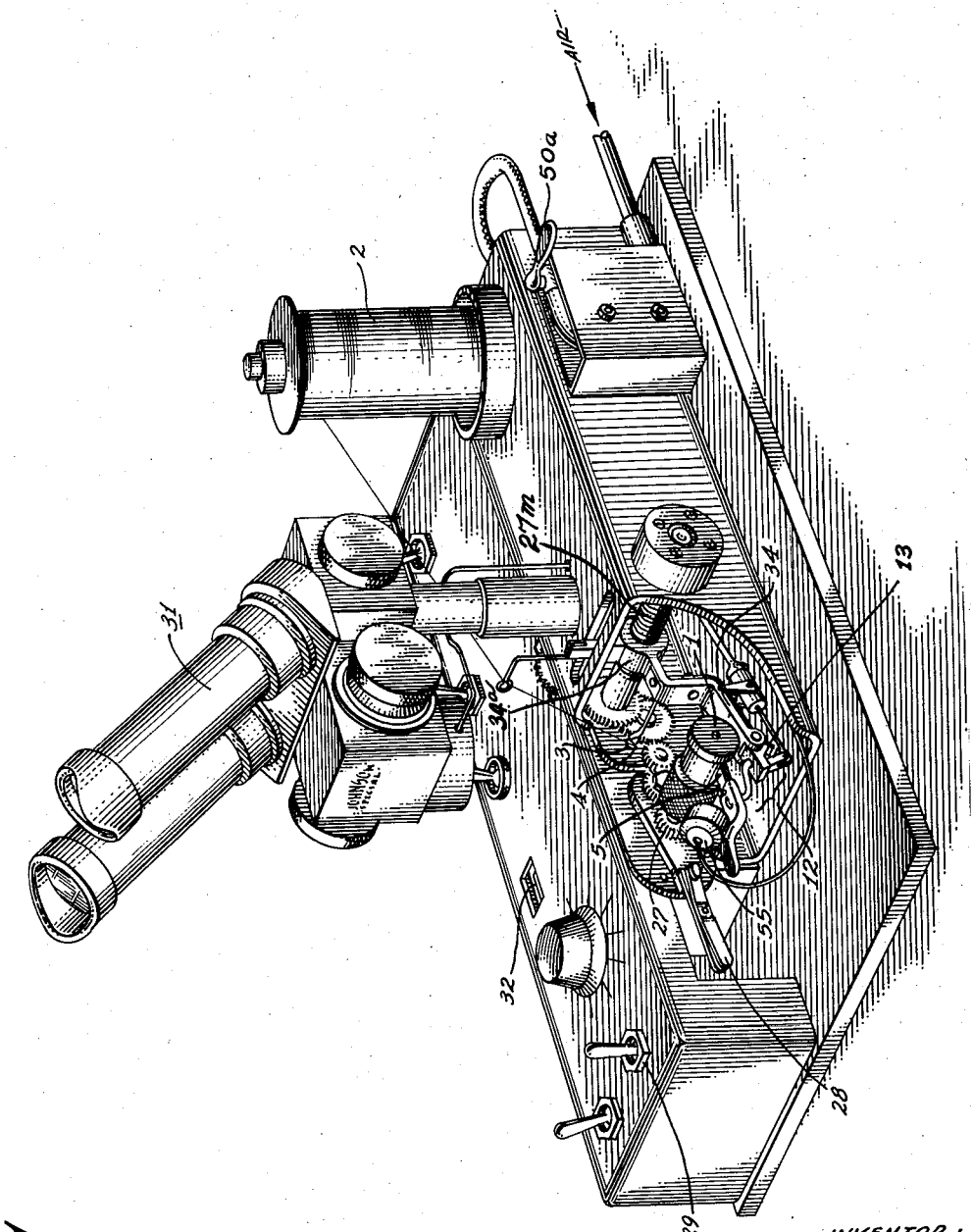
Figure 1 is an assembly drawing of the coil winder showing a microscope for viewing the winding operation.
Figure 11:
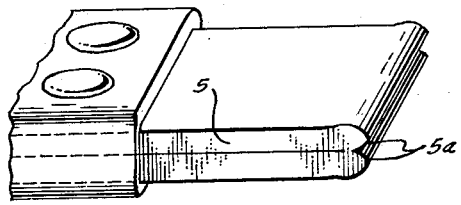
Figure 11 is a fragmentary, perspective view, drawn on a larger scale, of the wiper.
Figure 12:
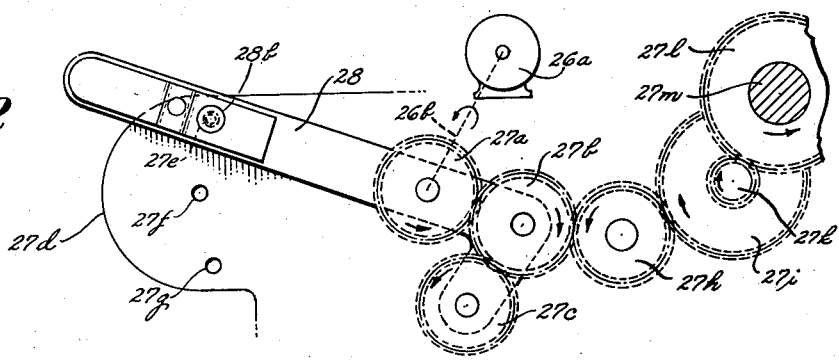
Figure 12 shows the gear train in its forward position.
Figure 13:
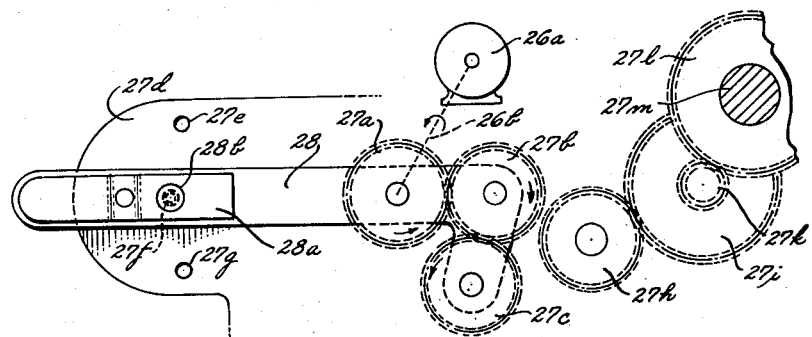
Figure 13 shows the gear train in its neutral position.
Figure 14:
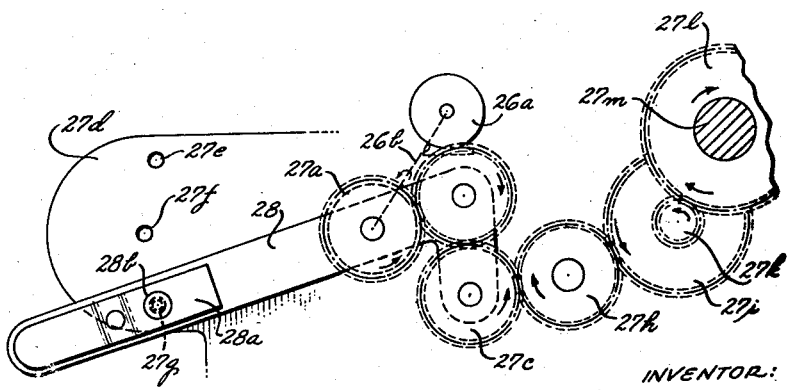
Figure 14 shows the gear train in its reverse position.

Referring in detail to Figures 1 through 9, the wire to be wound is attached to a coil form 1 rotated in one direction by a motor, at one end 6 and fed from a supply spool 2, the wire being approximately positioned by means of an overhanging arm 3 having a V-shaped groove 4 at its outermost point, said groove being preferable, though not essential. A wiper 5 shown in Figure 11 which may be a strip of Teflon, or other resilient material, folded on itself to provide a return bend the outer surface of which is slit to provide two edges 5a and with its ends held in a clamp 5b mounted on a link 53 pivotally connected to link 34 rests on the outer surface 10 of the turns of wire 11 wound on the rotating coil form 1 and its position may be at any convenient place on the circumference. The wiper 5 is caused to exert a slight pressure on the turns of wire at the line of contact, the pressure being applied by any suitable force producing means 12, Fig. 10. The wiper 5 may be positioned away from the coil form 1, if need be, by means of a cam surface 13 formed on link 53 and a retaining spring 13a secured to link 34. The supply spool 2 is placed over a vertical shaft 14 and may be separated from it by a loose fitting sleeve 15, the spool 2 resting on a hollow metal cap platform 20 which in turn is supported by a helical gear 21 forming a temporary closed chamber 22. The helical gear 21 is subjected to a torque by a force of air introduced through an orifice 23 in a chamber 24 in such manner as to impinge upon the helix of the gear, thus causing the gear 21 to tend to rotate somewhat in the manner of a turbine wheel. The torque of the gear 21 causes a troque to be applied to the shaft 14 and due to the helix, it will tend to rotate in one definite direction which is counter to that imparted to the supply spool 2 by the coil form 1, but in the same direction if the coil form is being unwound. The air stream 26 also exerts a force on the gear 21 and the cap 20 in a vertical direction and causes them to rise, the shaft 14 rises along with the gear by the same amount. Once the cap 20 is in its raised position the constant flow of air will maintain the position and flow out as shown at 25. The amount raised is constrained by the configuration of the shaft bearings 30. The raising eliminates the effect of the frictional resistance of the shaft 14 in the bearings 30 caused by the load, and also, the drag due to the surface tension of the oil in the bearings. The lifting and rotating of the shaft 14 occur simultaneously with the introduction of the air stream 26. The torque on the shaft 14 is transmitted to the supply spool 2 by means of friction between the shaft 14 and the spool 2. Thus, in the event that any slack forms in the wire being wound, it will be taken up by the counter rotation of the spool 2 due to the torque on the shaft 14. Regulation of the applied torque is obtained by control of the air supplied to the gear 21 and the torque must be such that the total tension on the wire is less than the tensile stress of the wire being wound. The wiper 5 is caused to move progressively along a lateral path in the desired direction of winding so that the movement of the wiper 5 is slower than the movement across the coil form 1 of the turns of wire. The effect of this is to prevent formation of any voids by a lateral force on the wire partially embedded in the edge of the wiper 5 due to the resilience of the material of which it is made. A motor 26a rotates the coil form 1 and also actuates a gear train 27 which in turn controls the movement laterally of the wiper 5 and the overhanging arm 3. The gear train 27 is composed of several gears which are so arranged that the wiper 5 may be traversed across the coil form 1 in either lateral direction, i.e. either from left to right or right to left. Referring to Figures 1 and 12 to 14, the gear 27a is connected to the motor 26a which rotates the coil form by a shaft 26b and rotated thereby. Rotatable on shaft 26b and pivoted with respect thereto is a lever arm 28 having a spring member 28a and positioning pin 28b secured thereto. Pinned to the arm 28 is a gear 27b which is in constant mesh with gear 27a as is gear 27c similarly pinned to the arm 28. Three holes, 27e, 27f, and 27g, are provided in the side of the gear box 27d for retaining the positioning pin 28b and determining the lever arm 28 position, i.e. the forward position 27e, the neutral position 27f, and the reverse position 27g. In the forward position shown in Figures 1 and 12, gear 27b meshes directly with gear 27h which in turn meshes with gear 27i thus causing pinion gear 27k to rotate clockwise as indicated. Gear 27k meshes with gear 27l which is fitted around a threaded shaft 27m and rotated counter-clockwise thereby. Referring to Figure 1 in particular, the shaft 27m is threaded at one end thereof and, when caused to rotate, is effective to drive the link 34 laterally, the link being carried by a threaded boss 34a meshing with the threaded shaft 27m. Since the wiper 5 is linked to the element 34 the wiper 5 is constrained to move along with, and in the same direction as, the link 34. Referring now to Figure 14, the lever arm 28 is in the reverse position and gear 27c meshes with gear 27h thus causing the shaft 27m to be rotated in a clockwise direction as indicated by the arrows. In the neutral position shown in Figure 13, neither gear 27b or 27c are in mesh with gear 27h and hence the shaft 27m is not caused to rotate, thus the link 34 and the wiper 5 are retained in their original position. Coil form 1 will of course rotate while motor 26a continues to run. A toggle switch 29 controls a reversing mechanism in the motor 26a so that the coil form 1 is capable of rotating in the opposite direction when it is desired to unwind the form 1. Visual inspection of the actual winding on the core is afforded by a microscope 31. A counter 32 records the number of turns applied to the core.

A suggested force producing means 12 is shown in Figure 10 wherein air is introduced through a control valve the handle of which is indicated at 50a, Figure 1, in a cylinder 50 having a piston 51 and compression spring 52 placed thereon. When the air is introduced it forces the piston 51 axially thus causing the link 53 to pivot about the pin 54 which in turn causes the wiper 5 to move against the coil form 1. The amount of pressure applied by the wiper 5 will be dependent upon the air pressure supplied. When the air pressure is diminished the spring 52 will cause the wiper 5 to be moved away from the form 1.

The operation of my invention is as follows:

The first turns of the coil are wound only approximately in position to start the coil 1. As the coil form 1 is rotated, the shaft traversing the wiper being left stationary momentarily, the pressure of the wiper 5 on the turning wire causes the wire to be temporarily partially embedded in the resilient material of the wiper edge. Any space left between the point 33 at which the wire is attached to the coil form 1 and the first turn of wire on the form 1 is taken up by the lateral force exerted by each new turn of wire as it is wound on the form 1. When all of the initial space is occupied by turns of wire, the shaft 27m is caused to rotate. The continued rotation of the coil form causes the wire running through the indent formed in the edge of the wiper to move progressively along the wiper edge. Since the wiper arm is traversed slightly more slowly than the speed at which the coil elongates, the pressure of the wiper 5 against the wire constrains the wire to lateral movement only, thus precluding any premature overlapping of the turns. The wiper 5 is connected to the laterally movable link 34 which keeps the wiper 5 moving in the same direction as that of the turns and approximately at a rate capable of maintaining the approximate relative position of the blade and the wire, yet slow enough to preclude causation of any voids or spaces between the turns by virtue of lateral pulling of the wiper 5. The impressed indent 40 causes the wire to wind so that each turn abuts the preceding one, thus preventing unevenness in spacing of the turns. Cement is placed on the rotating form 1 and is distributed over the surface by the wiper 5, thus firmly securing the windings of wire. When the turns are near an extreme side of the form 1 and the wiper 5 is then abutting the surface of the form's side, lateral movement being arrested by placing arm 28 in neutral until the first turn of the second layer has been laid, the continuous rotation of the form will cause the wire to be impressed along the wiper edge 5 until the abutting side of the wiper blade 5 is reached. A further turning of the form 1 will then cause the wire to overlap the last turn. This is due to the fact that the wire is constrained from any further lateral movement but is able to force a somewhat deeper indent in the resilient material. The gear train 27 which controls the movement of the link 34 is then reversed to allow reverse movement of the arm 3 and wiper 5 and the winding takes place from the overlapped side to the opposite one and so on until the coil is fully wound. A light 55 is conveniently placed for viewing.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. Apparatus for winding a wire on a form to provide an induction coil or the like, comprising: a support structure; a rotatable cylindrical coil form mounted on said structure and on which a wire is to be spirally wound to provide a coil; a supply spool on said structure containing wire adapted to be fed to said coil form; a wiper blade assembly which includes a resilient deformable wiper member and which is movably mounted on said structure; said wiper member comprising an elongated srip of material folded on itself to provide a return bend portion; said return bend portion being slit lengthwise to provide a pair of distinct edges which bear on the cylindrical surface of said coil form in parallel relation to the axis of said coil form and are adapted to be moved longitudinally of said cylindrical surface; motor means for rotating said coil form and for moving said wiper member longitudinally of said coil form; and a force producer adapted to exert a force on said wiper blade assembly thereby causing said pair of distinct edges to exert a predetermined pressure on said cylindrical surface and said wire to be partially embedded in said pair of distinct edges during a winding operation.

2. Apparatus for winding a wire on a form to provide an induction coil or the like, comprising: a support structure; a rotatable cylindrical coil form mounted on said structure and on which a wire is to be spirally wound to provide a coil; a supply spool on said structure containing wire adapted to be fed to said coil form; a screw member rotatably mounted on said structure; a wiper blade assembly which includes a resilient deformable wiper member and which is movably mounted on said structure; said wiper member comprising an elongated strip of material folded on itself to provide a return bend portion; said return bend portion being slit lengthwise to provide a pair of distinct edges which bear on the cylindrical surface of said coil form in parallel relation to the axis of said coil form and are adapted to be moved longitudinally of said cylindrical surface; motor means for rotating said coil form; a gear train extending between said motor means and screw member and adapted to impart rotary bidirectional movement to the latter which in turn imparts longitudinal movement to said wiper blade assembly; and a force producer adapted to exert a force on said wiper blade assembly thereby causing said pair of distinct edges to exert a predetermined pressure on said cylindrical surface and said wire to be partially embedded in said pair of distinct edges during a winding operation.

References Cited in the file of this patent

UNITED STATES PATENTS

| | | |
|---|---|---|
| 1,413,367 | Treanor | Apr. 18, 1922 |
| 1,786,457 | Sarver | Dec. 30, 1930 |
| 1,812,349 | Lillibridge | June 30, 1931 |
| 1,834,749 | Troxel | Dec. 1, 1931 |
| 1,994,373 | Thorne | Mar. 12, 1935 |
| 2,029,832 | Pierson | Feb. 4, 1936 |
| 2,093,815 | McIlvried et al. | Sept. 21, 1937 |
| 2,113,023 | Hinricher | Apr. 5, 1938 |
| 2,283,393 | Simons | May 19, 1942 |
| 2,393,548 | McCoy | Jan. 22, 1946 |
| 2,430,358 | Merwin et al. | Nov. 4, 1947 |
| 2,493,259 | Mooney | Jan. 3, 1950 |
| 2,507,297 | Bouget | May 9, 1950 |
| 2,605,061 | Howe | July 29, 1952 |
| 2,649,251 | Nordell | Aug. 18, 1953 |
| 2,666,289 | Bunch | Jan. 19, 1954 |

FOREIGN PATENTS

| | | |
|---|---|---|
| 271,007 | Italy | Jan. 27, 1930 |